US008046592B2

(12) United States Patent
Crane et al.

(10) Patent No.: US 8,046,592 B2
(45) Date of Patent: Oct. 25, 2011

(54) METHOD AND APPARATUS FOR SECURING THE PRIVACY OF SENSITIVE INFORMATION IN A DATA-HANDLING SYSTEM

(75) Inventors: Stephen James Crane, Bristol (GB); Richard James Smith, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1466 days.

(21) Appl. No.: 11/337,068

(22) Filed: Jan. 23, 2006

(65) Prior Publication Data

US 2007/0192630 A1    Aug. 16, 2007

(30) Foreign Application Priority Data

Jan. 24, 2005    (GB) .................................. 0501437.8

(51) Int. Cl.
*G06F 12/14* (2006.01)
(52) U.S. Cl. ....................................... 713/193; 713/165
(58) Field of Classification Search .................. 713/153, 713/163, 183, 193, 340, 164, 150; 714/38, 714/49, 48, 35, 37; 709/203, 217, 223, 237, 709/225, 229, 227; 726/22, 14, 13, 11, 34, 726/25, 26, 27; 380/42, 55, 58, 46; 382/225, 382/581; 375/340; 345/581, 55; 707/E17.128, 707/E17.129, E17.118
See application file for complete search history.

(56) References Cited

U.S. PATENT DOCUMENTS

| | | | |
|---|---|---|---|
| 6,532,459 B1 | 3/2003 | Berson | |
| 6,785,810 B1 | 8/2004 | Lirov et al. | |
| 2003/0212899 A1 | 11/2003 | Curtis | |
| 2003/0217060 A1 | 11/2003 | Stockton | |
| 2005/0114709 A1* | 5/2005 | Moore | 713/201 |
| 2005/0138532 A1* | 6/2005 | Park | 714/776 |
| 2005/0154699 A1* | 7/2005 | Lipkin et al. | 707/1 |
| 2005/0198083 A1* | 9/2005 | Saika et al. | 707/204 |
| 2005/0278626 A1* | 12/2005 | Malik | 715/530 |
| 2006/0005017 A1* | 1/2006 | Black et al. | 713/165 |
| 2006/0179073 A1* | 8/2006 | Kimura | 707/102 |

FOREIGN PATENT DOCUMENTS

WO    2004/027653 A2    4/2004

* cited by examiner

*Primary Examiner* — Vivek Srivastava
*Assistant Examiner* — Nega Woldemariam

(57) ABSTRACT

A data-handling system (20) is arranged to scan through data it holds for instances of sensitive information as identified by reference (35) to a set of sensitive-information identifiers held by the system. Each identifier identifies one or more items of sensitive information (25) and is so formed or protected as to not reveal any such item. Following an instance of sensitive information being found by the scan, it is replaced by a reference to an instance of the corresponding sensitive-information item (25) held in protected storage (21). As a result, in due course the only instances of, sensitive information held by the system (20) will be those in the protected storage (21).

23 Claims, 2 Drawing Sheets

METHOD AND APPARATUS FOR SECURING THE PRIVACY OF SENSITIVE INFORMATION IN A DATA-HANDLING SYSTEM

FIELD OF THE INVENTION

The present invention relates to method and apparatus for securing the privacy of sensitive information in a data-handling system. As used herein, the term "sensitive information" means any information that is to be protected from unauthorized disclosure, whether this be personal information of a user (such as the user's name, address, bank account number or credit card number), commercially or technically sensitive information of an organization, military information, political information, or the like.

BACKGROUND OF THE INVENTION

The privacy of sensitive information held on a data-handling system such as a personal computer is increasingly under threat from a range of software generically known as "spyware" that becomes installed, typically over a network, without the user's consent on the data-handling system. Such spyware can be arranged to collect information about the user and the user's habits; in particular, spyware can be set to scan the data-handling system for information that by its general form could correspond to sensitive information such as the user's name, address or bank account number.

It is known to provide data-handling systems with various forms of protected storage which give varying levels of protection of their contents against discovery by spyware. However, protected storage can give a false sense of security as it does not protect instances of the content that are held on the data handling system outside of the protected storage. For example, personal information is often held in multiple different locations when used by multiple applications or administrative tools and it is likely that not all of these instances of personal information will be held in protected storage.

Although computer-knowledgeable users may be able to utilize correctly sensitive-information protection mechanisms such as protected storage, many users have neither the knowledge nor commitment to make proper use of these mechanisms and a more active approach to countering spyware is desirable. One approach recently taken to the protection of sensitive information from spyware is to provide programs that actively seek out spyware typically by scanning the system looking for the signatures of known spyware programs. Whilst such an approach has merit, it also suffers from the problems inherent in all signature based systems, namely reliance on up-to-date signature files and diligent users.

Another mechanism that is used to protect sensitive information is to control how known instances of sensitive information are handled and stored; for example, before any known instance of personal information is included in an outgoing message, the user may be asked to confirm that this is intended.

It is an object of the present invention to facilitate the privacy protection of sensitive information held by a data-handling system.

SUMMARY OF THE INVENTION

According to one aspect of the present invention, there is provided a method of securing the privacy of sensitive information in a data-handling system, comprising:

using the data-handling system to search through data it holds for instances of sensitive information as identified by reference to at least one sensitive-information identifier held by the system, the or each identifier identifying one or more items of sensitive information and being so formed or protected as to not reveal any such item; and following an instance of sensitive information being found by the search, replacing it with a reference to an instance of the item of sensitive information concerned that is held in protected storage of the data-handling system.

A sensitive-information identifier can take several different forms such as, for example, an actual item of sensitive information held in protected storage, a hash of such an item, or a template having a particular generic form.

According to another aspect of the present invention, there is provided data-handling apparatus comprising:

a data storage arrangement comprising unprotected storage and protected storage, the data storage arrangement being arranged to hold at least one sensitive-information identifier identifying one or more items of sensitive information and so formed or protected as to not reveal any such item;

a scanning arrangement for searching through data in the unprotected storage for instances of sensitive information as identified by said at least one sensitive-information identifier; and a privacy-secural arrangement arranged, following an instance of sensitive information being found by the scanning arrangement, to replace it with a reference to an instance of the item of sensitive information concerned that is held in said protected storage.

According to a further aspect of the present invention, there is provided a computer program product for conditioning a data-handling system to carry out operations of:

searching through data held by the data-handling system for instances of sensitive information as identified by reference to at least one sensitive-information identifier held by the system, the or each identifier identifying one or more items of sensitive information and being so formed or protected as to not reveal any such item; and following an instance of sensitive information being found by the search, replacing it with a reference to an instance of the item of sensitive information concerned that is held in protected storage of the data-handling system.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

As used herein, the term "protected storage" is intended to cover any form of storage that provides an enhanced degree of security over normal system storage in a data-handling system. As already noted, various forms of protected storage are known and include both password-protected memory devices and solutions that employ data encryption techniques to protect information.

Figure 1:
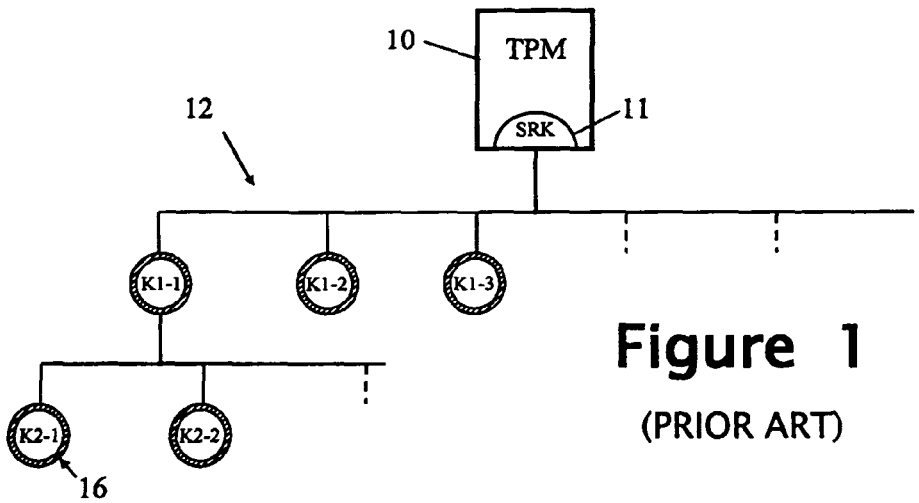
FIG. 1 is a diagram of a known form of protected storage based on a key hierarchy associated with a Trusted Platform Module.

By way of example, one known form of protected storage mechanism is that provided by a Trusted Platform Module built according to the principles set out, for example, in the book "trusted computing platforms—tcpa technology in context"; Pearson (editor); Prentice Hall; ISBN 0-13-009220-7". A Trusted Platform Module (TPM) typically takes the form of a hardware chip that comprises a processor, separate from the main system CPU, various cryptographic functions, and memory for permanently holding secrets such as a storage root key (SRK). As illustrated in FIG. 1 of the accompanying drawings, the TPM 10 supports a protected storage mechanism in the form of a hierarchy (tree) 12 of data objects the root of which is the SRK 11; apart from the SRK that is permanently stored in the TPM (and not released from it), the tree can be stored outside of the TPM. When information in a node of the tree 12 is used or revealed, the node is manipulated by the TPM. Each intermediate node object in the tree is encrypted by a key in the node object above it in the tree (the parent node), all the way back to the SRK root node. Thus, in the FIG. 1 example, the SRK 11 encrypts the next-level keys K1-1, K1-2, K1-3 etc whilst key K1-1 is used to encrypt the data in its dependent nodes, key K1-2 is used to encrypt data in its dependent nodes, and so on. Each key has an associated authorisation value that must be presented to the TPM (or, more accurately, used in a protocol that proves knowledge of the value without revealing the value) before the TPM permits the key to be used. Intermediate nodes in the tree will always be keys but leaf nodes 16 can be arbitrary data, though frequently they will also be keys (such as symmetric keys for use by application processes in protecting bulk data); in FIG. 1, the depicted leaf nodes 16 are depicted as keys K2-1, K2-2, etc.

Figure 2:
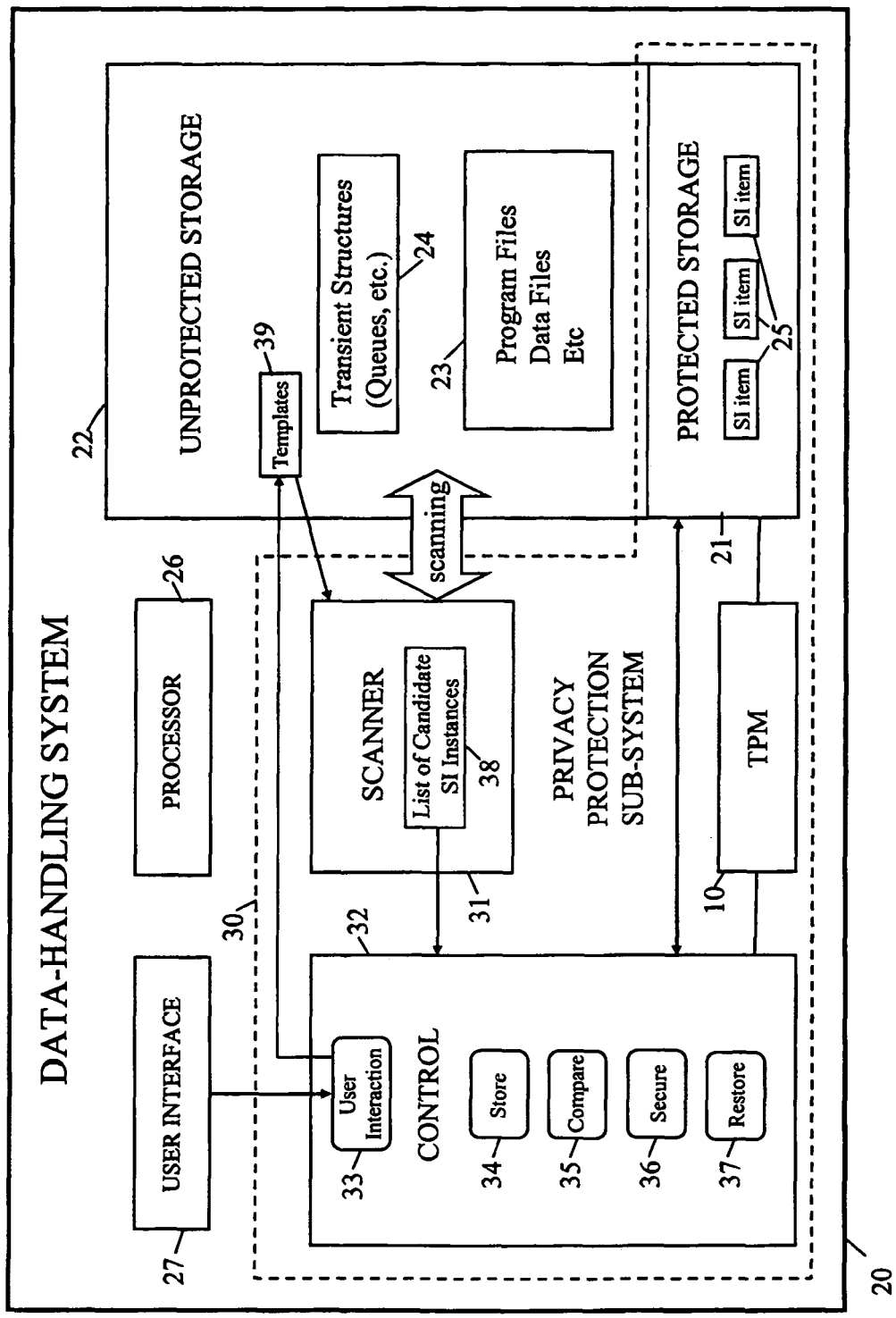
FIG. 2 is a diagram of a data handling system embodying the invention.

Turning now to a consideration of the embodiment of the invention illustrated in FIG. 2, a data-handling system 20 (for example, a personal computer) has its storage logically divided into protected storage 21 and unprotected storage 22, it being appreciated that the storage is physically embodied, for example, as semiconductor (RAM, ROM) memory, local hard disc drives, removable media storage drives, and any logically associated network-connected storage resources.

The data held in the unprotected storage 22 is typically organized into persistent program files and data files, and transient data structures such as communication queues that are created and destroyed during the running of programs.

The protected storage 21 is, in the present example, organized as a hierarchy of nodes in the manner described above with reference to FIG. 1 with the storage root key being held in a hardware trusted platform module, TPM, 10 that controls the release of the keys in the non-leaf nodes of the hierarchy, thereby controlling access to data held in the leaf nodes. In the present case, the leaf nodes hold respective items 25 of sensitive information (for convenience, the abbreviation "SI" is frequently used herein for "sensitive information" and, in particular, the items 25 of sensitive information are generally referred to below as "SI items").

The data-handling system 20 includes a processor sub-system 26 for executing programs and a user interface sub-system 27. The execution of programs by the processor sub-system provides the data-handling system with desired functionality. In the present case, programs executing on the processor sub-system are used to provide a scanner functional block 31 and a control function block 32 of a privacy protection sub-system 30 that also comprises the protected storage arrangement formed by the TPM 10 and protected storage hierarchy 21. As will be appreciated by persons skilled in the art, the scanner block 31 and control block 32 could alternatively be provided by dedicated elements whether based on a program-controlled processor or specific hardware circuitry.

In the present embodiment of the privacy protection sub-system 30, the scanner 31 is arranged to search through data held in the unprotected storage 22 for candidate instances of sensitive information—by "candidate instance" is meant a data string (or, more generally, a data block) having a general form that matches a pre-defined template 39. Templates 39 are defined by a user through the user interface 27 under the control of a user interaction component 33 of the control block 33. Templates do not specify any specific item of sensitive information, merely a generic form—for example a template might designate sixteen decimal-digit strings as candidate sensitive information since credit card numbers are often of this form. The templates are, in this example, held in unprotected storage since they do not need to be kept confidential. However, preferably, an integrity check should be run on the templates before use to ensure none has been maliciously changed; this can be done by having the privacy protection sub-system 30 digitally sign the templates using a private key held in the protected storage, the scanner block 31 then being arranged to check the integrity of the templates using the digital signature before using the templates. Alternatively, the templates can themselves be held in protected storage 21.

The user interaction component 33 of control block 32 also enables a user to input specific items of sensitive information for storage by control-block component 34 as SI items 25 in the protected storage 21. As will be further explained below, one use of the SI items 25 is to serve as sensitive-information identifiers for use in recognizing corresponding instances of sensitive information encountered by the scanner 31 in the data held in the unprotected storage 22.

The control block 32 further comprises:
- a comparison component 35 for comparing candidate instances of sensitive information found by the scanner 31 with the SI items 25;
- a component 36 for securing an identified instance of sensitive information by replacing the instance with a reference to the corresponding SI item 25 held in protected storage 21; and
- a restore component 37 for replacing, subject to appropriate authorization, a sensitive-information reference in data held in unprotected storage 32 with a copy of the corresponding SI item 25.

As will be appreciated by persons skilled in the art and as described in the above-mentioned textbook on trusted computing platforms, the storage of new SI items 25 into protected storage 21, and the access of SI items 25 held in the protected storage, requires the control block 32 to obtain an appropriate key from the TPM 10 by supplying a suitable authorization code to the TPM.

The operation of the privacy protection sub-system 30 will now be described with reference to the flowchart of FIG. 3.

Figure 3:
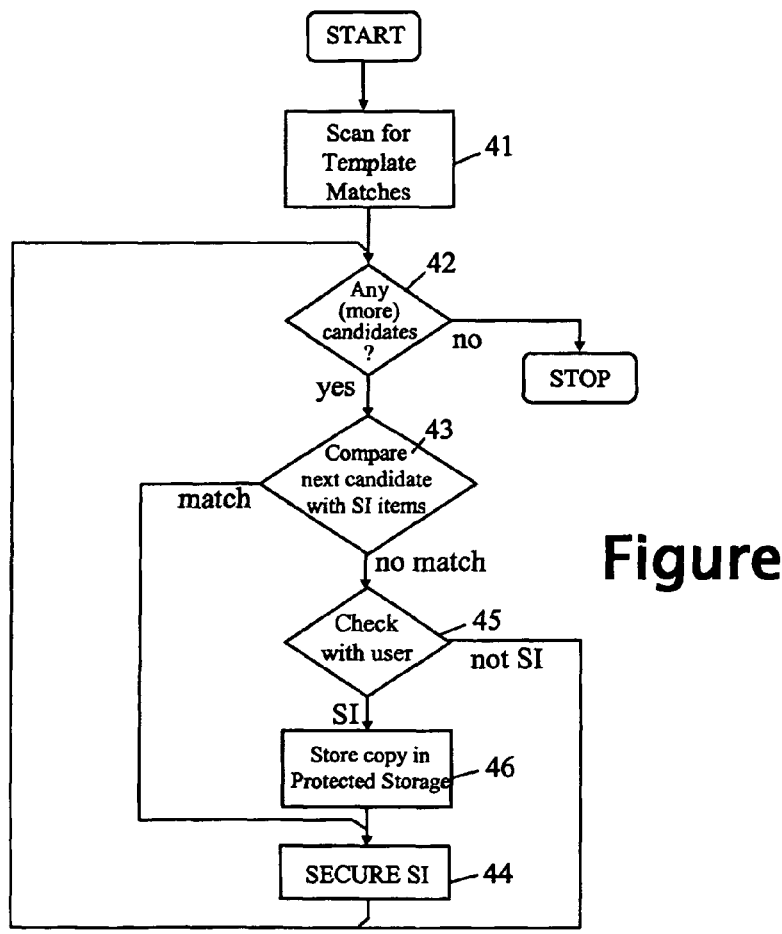
FIG. 3 is a flow chart illustrating operation of the FIG. 2 system.

Following activation of the privacy protection sub-system 30, the scanner searches through data held in unprotected storage 22 for data strings that match any of the templates 39 (step 41 of FIG. 3). When a template match is found, the data string concerned and its location are stored in a temporary list 38 as a candidate instance of sensitive information. The scanner then resumes its search. Searching continues until all the target data has been searched.

If at the end of the searching, no candidate SI instances have been found (tested in step 42 of FIG. 3), processing terminates. However, assuming that at least one candidate SI instance has been found, processing continues at step 43 in which the first candidate SI instance in the candidate-instance list 38 is compared by the comparison component 35 with the SI items 25 held in the protected storage, the SI items here serving as SI identifiers (see step 43 of FIG. 3).

If the candidate SI instance is matched with one of the SI items 25, the control-block component 36 is used to secure the now-confirmed instance of sensitive information by replacing its occurrence with a reference to the corresponding SI item 25 held in protected storage 21 (step 44 of FIG. 3). The candidate-instance list 38 is also updated by removing the candidate instance just processed.

However, if in step 43 no SI item 25 is found to match the candidate SI instance, the user interaction component 33 is used to ask the user whether or not the candidate SI instance is an actual instance of sensitive information (see step 45):

- If the user indicates that the candidate SI instance is sensitive information, and thus a new SI item not currently held in the protected storage, the control-block component 34 is used to store a copy of the SI instance in the protected storage as an SI item 25 (step 46 of FIG. 3); thereafter, processing continues at step 44 with the SI instance found by the scanner 31 being secured in the manner already described.
- If the user indicates that the candidate SI instance is not sensitive, that instance is removed from the candidate-instance list 38 and steps 46 and 44 are skipped.

At this point, the first candidate SI instance has been dealt with; processing now returns to step 42 to determine if there are any more candidate SI instances to be checked. The processing of candidate SI items continues in this manner until all candidate items have been processed at which point there are no more candidates in the candidate-instance list 38 so that the test in step 42 results in termination of processing.

As a result of the foregoing operation of the privacy protection sub-system 30, upon completion of its processing, all items of sensitive information found in the data searched by the scanner have been replaced by references to the corresponding SI items 25 held in protected storage 22 whereby the sensitive information is protected against collection by spyware.

When a user of the data-handling system 20 subsequently initiates processing of data that includes a reference to an SI item 25 held in protected storage 22, the system is arranged to recognize the reference and to use the control-block component 37 to replace the reference with the SI item concerned subject to an appropriate authorizing input being, or having been, made. This authorizing input can be a password associated with the SI item concerned and specified at the time that the item was first added to the protected storage 21; in this case, the user is asked to input this password each time a replacement is to be made. Alternatively, where users are required to log on to the system 20 using a user-specific password or other identifying input, then the identity of the user is associated with each new SI item stored whilst the user is logged on; subsequently, a reference to an SI item will be replaced only if the currently logged on user (as indicated by the password or other identifying input given at log on) is the same as the user present when the item was first stored; in this case, the authorizing input required by the component 36 is the user-identifying input made upon log on by the user.

Additional/alternative authorization conditions can be set. For example, where an SI item is highly sensitive business information, two separate manager signatures (that is, electronic approvals) can be required in respect of any usage of the SI item that involves its dissemination from the data handling system 20. A location condition can also be set requiring that before a reference is replaced by the corresponding SI item, the data-handling system must by physically present at a particular location (for example, as indicated by a trusted GPS module of the system).

The replacement of a reference with the corresponding SI item is only done for the copy of the data concerned that is held in working memory; the SI item is not entered into the corresponding data file held, for example, on a storage disc or tape (unless the user gives permission for this).

The manner of operation of the privacy-protection sub-system 30 described above with reference to FIG. 3 is appropriate for when single scans are to be carried at intervals (such as a defined time each day or each week). However, the privacy-protection sub-system can alternatively be caused to operate in a continuous, background, mode in which as soon as one scan of the data in unprotected storage has been completed, a new scan is started; in this case, the presence of candidates in the candidate-instance list is indicated to the user but steps 43 to 46 of the FIG. 3 process are not performed until requested by the user.

A further alternative manner of operation of the privacy-protection sub-system 30 is for scanning to be suspended each time a candidate instance is found with steps 43 to 46 then being immediately carried out, after which the scan is resumed. This manner of operation can be usefully employed when data is being added to the data-handling system (for example by user input or by being restored from archive); in this case, the scope of the scan is preferably restricted to the newly added data. Thus, for example, the privacy-protection sub-system 30 can be activated whenever the user inputs data input through a keyboard of the user interface sub-system 27, the privacy-protection sub-system limiting its scan to the newly-entered data as held in working memory. Whenever a SI instance is detected, the privacy-protection sub-system takes appropriate action, typically including notifying the user, in this manner, SI instances are caught before they are stored to the file system where they will generally be more vulnerable to spyware.

It will be appreciated that whilst the SI items are protected when held in the protected storage 21, in the FIG. 2 embodiment these items are used, unprotected by the protected storage mechanism, during the process of comparison with candidate SI instances effected by the comparison component 35 of the control block 32. Of course, the fact that the comparison process is transient in nature offers some protection against spyware. However, another possible vulnerability is the need for the comparison component 35 to have an associated authorization value which it must provide to the TPM to access the SI items in protected storage; although this authorization value can be buried in the program code implementing the comparison component, it is a potential point of weakness.

The comparison component 35 is therefore preferably implemented in a manner providing protection against subversive monitoring. For example, the comparison component 35 can be implemented in a hardware component which cannot be searched by spyware; advantageously, this hardware component is the TPM 10 (of course, in this case, the comparison component is not required to supply an authorisation code to the TPM as it is implicitly trusted).

Alternatively, the comparison component 35 can be protected by implementing it as a process operating in a benign operating environment such as a compartmented operating system, an environment where no other processes are allowed to be installed at the same time, or an environment where the state of the system is known to be benign (as indicated by measurements made by a root of trust for measurement and compared against values held in nodes of the protected storage hierarchy and which determine whether the keys or other item associated with the nodes concerned can be released—further details of this approach are to be found in the above-mentioned textbook on trusted platform technology). With regard to the authorisation code required by the TPM before unlocking nodes of the protected storage hierarchy, this code is advantageously constituted by a hash of the program code implementing the comparison component 35 whereby the TPM will only unseal the relevant nodes if an unmodified version of the component code is installed which cannot therefore implement hidden behaviour.

A further alternative protection mechanism for the comparison component 35 is to arrange for the execution of the comparison process by an uninterruptible process that deletes all unprotected copies of the SI items before terminating.

It will be appreciated by persons skilled in the art that many other variants are possible to the above-described embodiment of the invention. For example, instead of using the SI items themselves as SI identifiers, hashes of the SI items could be used for comparison against hashes of the candidate SI instances. In the context of the present specification, a "hash" of a SI item means a condensed representation of the item from which it is not possible to recover significant information about the item either at all or without the use of a secret; the hash function used is, for example, a one-way hash function, or a keyed hash function or MAC (message authentication code). The hashes of the SI items can be stored either in protected storage 21 along with the SI items themselves, or in unprotected storage 22 (since the hashes do not reveal the SI items to which they correspond). In this latter case, a mechanism is preferably provided to detect subversion of the hashes or addition of hashes by malicious agents. An advantage of implementing the hashes as keyed hashes or hashes formed according to a confidential algorithm is that this prevents the mounting of a dictionary-type attack to determine the SI items corresponding to the hashes.

Furthermore, rather than using a two-stage process to detect instances of sensitive information (detection of candidate SI instances using templates 39, followed by comparison of these candidates with the SI identifiers), the scanner 31 can be combined with the comparison component 35 to effect a single stage detection process in which data strings in the scanned data are compared directly with SI identifiers without the intermediate generation of a list of candidate SI instances. The SI identifiers can be either the SI items themselves or hashes of these items. In fact, the SI identifiers can alternatively be constituted by templates like the templates 39—in this case, any match to a template is treated as an instance of sensitive information and is removed to the protected storage and replaced by a reference to the instance in protected storage.

The SI items held in protected storage are preferably physically stored in a detachable module that a user can remove and take away when leaving the data-handling system; the module may also contain part of the unprotected storage. Advantageously, where SI identifiers are used that are other than the SI items themselves, removal of the detachable module containing the SI items leaves in place in the rest of the system the SI identifiers. This permits the privacy protection sub-system to continue to carry out scanning and secural of known SI items represented by these SI identifiers.

As regards how items of sensitive information are initially identified to the privacy protection sub-system, rather than the user having to input individual items or define templates, provision can be made to enable the user to identify an existing collection of data as sensitive information. For example, the contents of an address book or contacts list held by the data-handling system can be generically identified as sensitive information. It is then the responsibility of the privacy protection system to separate out the designated information into individual SI items and to generate SI identifiers where these are not the items themselves.

As already indicated, the extent of the data scanned by the scanner 31 can be specified and can, for example, be set to cover only those parts of the unprotected storage considered to be at greatest risk. Furthermore, the scanner 31 can be arranged also to scan unprotected storage in subordinate systems temporarily linked to the data-handling system (for example, a PDA that is temporarily connected to the system to synchronise its data with the data held by the system).

Where SI references inserted by the secural component 36 are subsequently replaced by the corresponding SI items, the replacement of a reference to an SI item that was originally of text form can be effected by substitution of an image of the SI item concerned (this image being subsequently generated from the SI item at the time the replacement is made). This arrangement is useful in protecting against screen scraping, that is, the capturing data from the system by snooping the contents of some display that is not actually intended for inspection by programs. The instances of sensitive information searched for by the scanner 31 are not restricted to being text data strings but can be any form of data such as image data (for example, an iris scan) or audio data (for example, user voice pattern). Particularly where the sensitive information to be protected is biometric data, the comparison component will need to allow for certain variations between the stored SI items and corresponding instances in the data being scanned. Appropriate techniques for determining a match of biometric data are known to persons skilled in the relevant art.

Since many items of sensitive information are relatively simple in form and often of known length, there exists the potential of mounting a dictionary type of attack, as already mentioned above. For example, an attacker could arrange for fake data to be inserted into the system that contained all possible versions of a particular type of information (for example, all possible credit card numbers associated with a particular issuer); these versions can be included in one or multiple files or can be cycled through over a period of time. In this case, all the attacker need do is to wait to see which versions of the information are removed by the privacy-protection sub-system 30. A number of measures can be taken to protect against such an attack. Thus to protect against an attack where only a few versions of the information are presented at any one time, the scanning repetition rate can be kept low enough to make the average time until the correct version is presented impractically long. Where many versions of the information are presented at one time, it is a relatively easy matter for the privacy-protection sub-system 30 to spot this situation, particularly if a template is being used to identify candidate SI instances (in this case, there will be a very large number of candidates). Of course, by presenting the user with every identified instance of sensitive information in its context before secural action is taken, it is likely that the user will spot false occurrences generated by the attacker.

The invention claimed is:

1. A method of securing the privacy of sensitive information in a data-handling system, comprising:

using the data-handling system to search through data including program files, data files, and transient structures in unprotected storage for instances of sensitive information as identified by reference to at least one sensitive-information identifier held by the system, the or each identifier comprising a template indicative of a generic form possessed by multiple items of sensitive information, identifying one or more items of sensitive information, and being so formed or protected as to not reveal any such item; and following an instance of sensitive information being found by the search, replacing the instance with a reference to an instance of the item of sensitive information concerned that is held in protected storage of the data-handling system, wherein in searching for instances of sensitive information, candidate instances are identified by reference to the template, and each candidate instance is checked against at least one said identifier to determine whether the candidate instance is an actual instance of sensitive information.

2. A method according to claim 1, wherein the instance of the item of sensitive information that is held in protected storage and is indicated by said reference, is already present in the protected storage at the time that the instance in said data is found by the search.

3. A method according to claim 1, wherein the instance of the item of sensitive information that is held in protected storage and is indicated by said reference, is provided to the protected storage by removing the instance, found during search of said data, to the protected store.

4. A method according to claim 1, wherein said protected storage is provided by a detachable module intended for removal by a user from the data-handling system.

5. A method according to claim 1, wherein at least one said identifier comprises a said item of sensitive information held in the protected storage of the data-handling system.

6. A method according to claim 1, wherein at least one said identifier comprises a hash of a said item of sensitive information.

7. A method according to claim 1, wherein the protected storage holding the or each item of sensitive information is provided by a detachable module intended for removal by a user from the data-handling system; at least one said identifier comprising a hash of a said item of sensitive information, said hash being stored in the data-handling system outside of said detachable module whereby in the event of the user removing the detachable module, searching for instances of sensitive information can continue.

8. A method according to claim 1, wherein where the checking of a candidate instance against the or each identifier fails to indicate that the candidate instance is an actual instance of sensitive information, the data-handling system asks a user to indicate whether the candidate instance is to be treated as an item of sensitive information and, if so indicated by the user, creates a corresponding identifier for future use.

9. A method according to claim 1, wherein said data is first searched to generate a set of candidate instances, after which each candidate instance found is checked against at least one identifier to determine whether the candidate instance is an actual instance of sensitive information.

10. A method according to claim 1, wherein said at least one sensitive-information identifier is held in protected storage and is referenced in the course of searching said data for instances of sensitive information, by means of a mechanism protected against subversive monitoring.

11. A method according to claim 1, wherein the method further comprises subsequently replacing a said reference in a file accessed by a user with the corresponding item of sensitive information copied from the protected storage only after that user has provided an appropriate enabling input.

12. A method according to claim 1, wherein the method is carried out upon user input of data and in such a manner as to find and protect instances of sensitive information input by the user before they are stored to a file system.

13. Data-handling apparatus comprising:
a data storage arrangement comprising unprotected storage and protected storage, the data storage arrangement being arranged to hold at least one sensitive-information identifier comprising a template indicative of a generic form possessed by multiple items of sensitive information, identifying one or more items of sensitive information, and being so formed or protected as to not reveal any such item;

a scanning arrangement for searching through data including program files, data files, and transient structures in the unprotected storage for instances of sensitive information as identified using said at least one sensitive-information identifier, wherein the scanning arrangement is arranged to search for candidate instances of sensitive information that match the template indicative of a generic form possessed by one of more said items of sensitive information, the scanning arrangement being further arranged to check each candidate instance against at least one said identifier to determine whether the candidate instance is an actual instance of sensitive information; and a privacy-secural arrangement arranged, following an instance of sensitive information being found by the scanning arrangement, to replace the instance with a reference to an instance of the item of sensitive information concerned that is held in said protected storage.

14. Data-handling apparatus according to claim 13, wherein said protected storage is provided by a detachable module intended for removal by a user from the data-handling system.

15. Data-handling apparatus according to claim 13, wherein at least one said identifier further comprises one of:
a said item of sensitive information held in the protected storage; and
a hash of a said item of sensitive information.

16. Data-handling apparatus according to claim 13, wherein the protected storage holding the or each item of sensitive information is provided by a detachable module intended for removal by a user from the data-handling system; at least part of the unprotected storage being outside of said detachable module and being arranged to store at least one said identifier whereby in the event of the user removing the detachable module, the scanning arrangement can continue to search for instances of sensitive information.

17. Data-handling apparatus according to claim 13, wherein the scanning arrangement is so arranged that if checking of a candidate instance against the or each identifier fails to indicate that the candidate instance is an actual instance of sensitive information, the data-handling system is caused to ask a user to indicate whether the candidate instance is to be treated as an item of sensitive information, the scanning arrangement being arranged to respond to the user indicating that said candidate instance is to be treated as an item of sensitive information by creating a corresponding identifier for future use.

18. Data-handling apparatus according to claim 13, wherein said at least one sensitive-information identifier is arranged to be held in said protected storage, the scanning arrangement comprising a mechanism, protected against subversive monitoring, that is arranged to reference said at least one identifier in the course of searching said data for instances of sensitive information.

19. Data-handling apparatus according to claim 13, wherein the data-handling apparatus is arranged to replace a said reference in a file accessed by a user, with the corresponding item of sensitive information copied from the protected storage but only after that user has provided an appropriate enabling input.

20. Data-handling apparatus according to claim 13, further comprising a trusted platform module containing the protected storage.

21. Data-handling apparatus according to claim 13, further comprising a trusted platform module in which a portion of the scanning arrangement is implemented, wherein the trusted platform protects the portion of the scanning arrangement from being searched.

22. Data-handling apparatus according to claim 13, wherein the transient structures comprise a communication queue in the unprotected storage.

23. A none-transitory computer readable medium containing a computer program that when executed in a data-handling system causes the data-handling system to carry out operations of:

searching through data including program files, data files, and transient structures held in unprotected storage by the data-handling system for instances of sensitive information as identified by reference to at least one sensitive-information identifier held by the system, the or each identifier comprising a template indicative of a generic form possessed by multiple items of sensitive information, identifying one or more items of sensitive information, and being so formed or protected as to not reveal any such item, wherein in searching for instances of sensitive information, candidate instances are identified by reference to the template, and each candidate instance is checked against at least one said identifier to determine whether the candidate instance is an actual instance of sensitive information; and following an instance of sensitive information being found by the search, replacing the instance with a reference to an instance of the item of sensitive information concerned that is held in protected storage of the data-handling system.

* * * * *

UNITED STATES PATENT AND TRADEMARK OFFICE
CERTIFICATE OF CORRECTION

PATENT NO. : 8,046,592 B2  Page 1 of 1
APPLICATION NO. : 11/337068
DATED : October 25, 2011
INVENTOR(S) : Stephen James Crane et al.

It is certified that error appears in the above-identified patent and that said Letters Patent is hereby corrected as shown below:

In column 10, line 19, in Claim 13, delete "one of more" and insert -- one or more --, therefor.

In column 11, line 16, in Claim 23, delete "none" and insert -- non --, therefor.

Signed and Sealed this
Twelfth Day of June, 2012

David J. Kappos
*Director of the United States Patent and Trademark Office*